Figure 1:
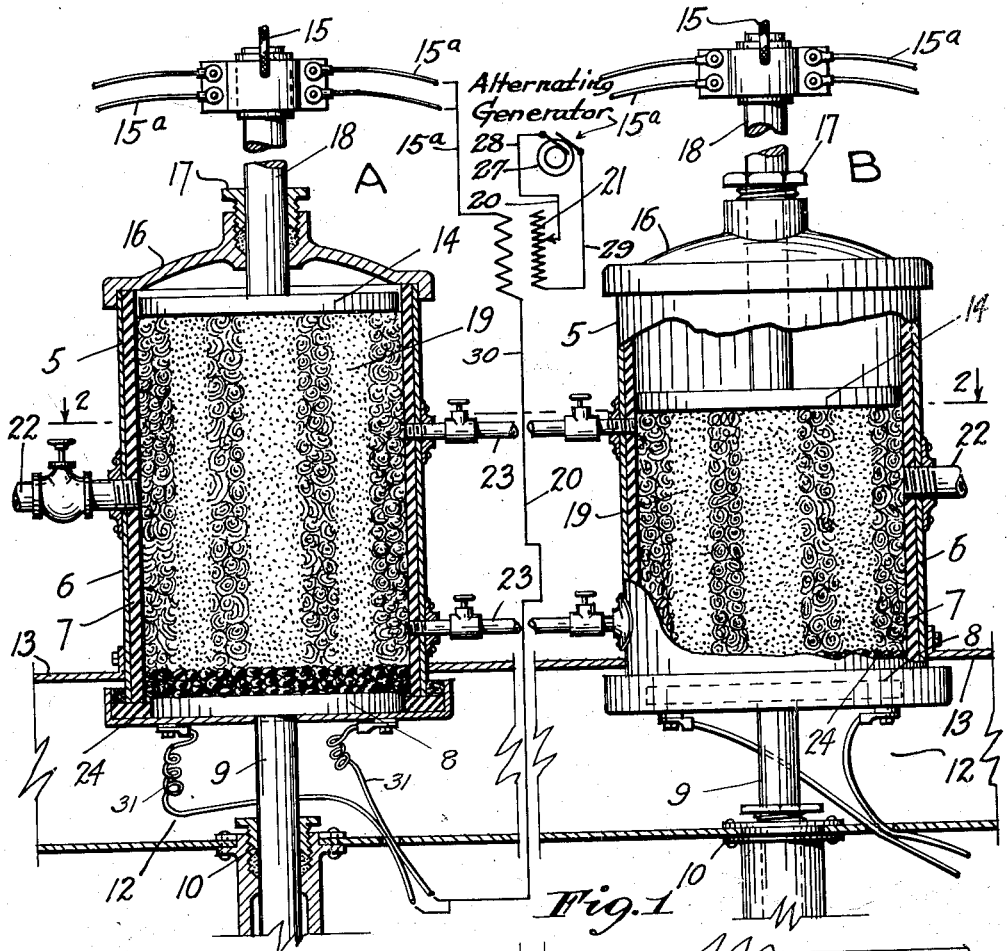

April 14, 1931. W. F. BLEECKER 1,800,500

PROCESS OF RECOVERING METALS

Filed June 18 1928

INVENTOR.
W. F. Bleecker
BY
ATTORNEY.

Patented Apr. 14, 1931

1,800,500

UNITED STATES PATENT OFFICE

WARREN F. BLEECKER, OF BOULDER, COLORADO

PROCESS OF RECOVERING METALS

Application filed June 18, 1928. Serial No. 286,287.

My invention relates to a process and apparatus for recovering metals from their ores and it pertains more especially to the recovery of zinc from zinc-ores by distillation, for which both the process and apparatus are particularly adapted.

The primary object of my invention resides in the provision of a simple, economical and highly efficient method of treating zinc ores for the recovery of their zinc content by distillation, by which at a low cost of installation and operation a substantially complete extraction of the desired metal may be effected without the presence of objectionable gases and other matter that would be detrimental to distillation of the zinc or would be disadvantageous in the subsequent process of condensing the zinc vapors to a liquid state.

With this and other objects in view, the process consists briefly in subjecting the ore together with a suitable reducing agent, to the heating influence of an electric current, in a vapor-tight electric retort, subsequent to preheating the charge in the retort in place.

The preheating step which is an important and essential feature of the process, eliminates volatile matter and by-products of reduction occurring at temperatures lower than the reduction temperature of zinc.

The preheating expels, prior to the reduction of the zinc, all deleterious substances such as those that may be present in the reducing agent and the ore. For example, the reducing agent may have tar or volatile hydro-carbons and the reducing agent or/and the ore may have free or combined water or volatile constituents, also there will be carbon-dioxide resulting from the action of the reducing agent on easily reducible oxides, and vapors that are freed during the preheating action.

Preheating, moreover, prepares the charge in the retort for its ready and thorough response to the action of the electric current, and inasmuch as the pre-heating of the charge is accomplished in place, after the retort has been charged for distillation, preliminary treatments of the materials in other localities or transference of materials from one place to another are completely avoided.

A further object of the invention is to provide the heat required in the preliminary treatment of the charge in the retort, by taking advantage of the high temperature of the residue of the reduction of a batch of material priorly treated in another retort by the same process.

I am aware that the recovery of zinc from zinc-ores by electrical resistance and a preheating step in general are old in the art and it is to be understood that the present invention is characterized by certain novel methods of treatment and novel features in operation and construction, which coordinate in effecting a practically complete recovery of the zinc contents of the ore, substantially free from objectionable impurities, particularly blue powder, and at a minimum cost of installation, labor, time and operation.

Principal among the features above refered to are a novel method of preheating the charge to a predetermined extent, the control and regulation of distilling temperature, and the prevention of slagging or fusing deteriorative to the reduction and recovery of the zinc and the response of the material to the electric current.

Other novel features both in operation and construction will be fully and clearly set forth in the course of the following description.

Figure 2:
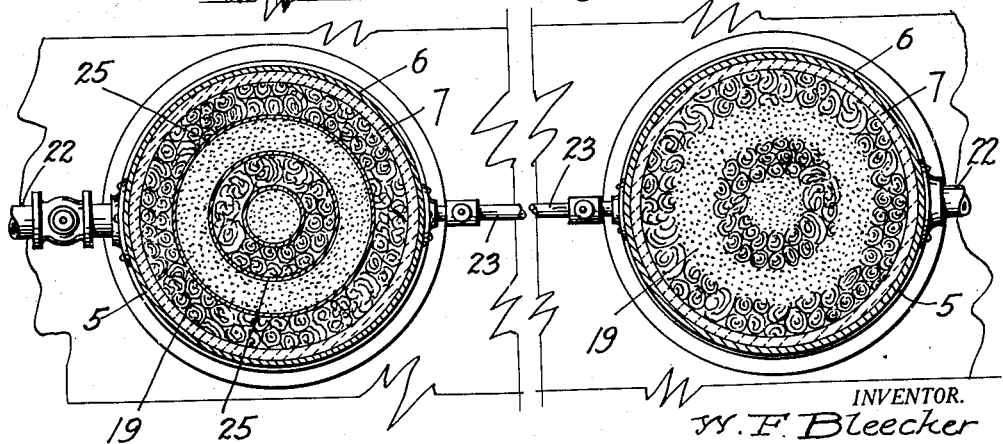

In the accompanying drawing,

Figure 1 represents in sectional elevation, an apparatus suitable for carrying the process into effect, and Figure 2, a transverse section on the line 2—2, Figure 1, showing the method and means for changing the retorts comprised in the apparatus.

The illustration represents the apparatus more or less in outline and without regard to details of construction, it being understood that variations in form, construction and arrangement of the elements and parts comprised in the apparatus may be availed of without departing from the spirit or scope of the invention.

Referring to the drawings, the apparatus shown therein comprises two units A and B, one of which contains the green charge under treatment, and the other the spent charge of a prior treatment, that is utilized in preheating the first mentioned charge.

The units as shown are identical in construction and the description of one unit and its connections with the other unit will suffice to convey a complete understanding of the distinctive features of the apparatus.

The reference character 5 designates in each unit, a retort that may be made in cylindrical form, of a steel shell 6 lined with refractory material 7 such as electrically sintered magnesite.

The bottom 8 of the retort on which, in the operation, the charge is supported, is movable and it may be composed of graphite, rammed carbon or other highly conductive material. The bottom should be removable to permit of emptying the retort of the residue after each reduction treatment and with this object in view, it may be mounted on a hydraulic piston such as has been indicated at 9.

Suitable packing devices, such as the stuffing box shown at 10, must be applied wherever necessary to prevent the escape of water or other liquid.

By downward movement of the hydraulic piston, the bottom, together with the spent charge supported thereon, may be lowered into a pit 12 below the floor-level 13 for the removal of the residue.

Movably fitted in the retort at the upper end thereof, is a slab 14 of graphite, rammed carbon or other conductive material that, in practice, is loosely supported on the charge and is capable of following the charge by gravity to remain in constant contact therewith as the depth of the mass decreases by shrinkage during the reduction process.

The top 14 may, with this end in view, be movably suspended by means of a wire cable 15. Another cable 15a functions to connect the electrode 14 in an electric circuit hereinafter to be described.

In order to prevent the escape of gases around the movable top, the shell of the retort may be closed at its upper end by means of a head 16 which has a stuffing box 17 through which passes the supporting electrode 18 of the conductive top 14.

The bottom-member 8 and the top-member 14 constitute electrodes at opposite ends of the charge indicated at 19, which in the operation provides the resistor traversed by the current as it passes from one electrode to another.

The terminal electrodes may be connected in any convenient circuit of electricity such as is indicated at 20 in the drawings, but it is desirable that the circuit should include a suitable device 21 to regulate the energy input.

The source of electric current may be an alternating current generator 27, as indicated in the drawings, or any other suitable means, which is connected by wires 28 and 29 with a current controlling device 21. The current controlling device 21 illustrated in the drawing is an adjustable transformer with voltage steps, but any other suitable controlling device may, of course, be employed. The current which is fed to the alternating current generator 27 flows from the conductor controlling device 21 through the conductor 15 to the upper electrode 18. The lower electrode 8 is connected to the controlling device 21 by the wire 31, and the charge within the retort acts as a resistance.

The lower electrode 8, which is carried by a metal cap, is insulated from the metallic body portion of the retort by the annular insulating members illustrated in Fig. 1 of the drawing, and the charge within the retort is also insulated from the metallic body portion of the retort, so that the said charge will be subjected to a maximum effect of the current. This construction will enable the terminals of the wire 31 to be attached to the metallic cap which supports the lower electrode 8, but the electrical connection between the wire 31 and the electrode 8 may be made in any other suitable manner.

The controlling device is of considerable value in the operation since it permits of maintaining a uniform temperature in the retort as will hereinafter be more fully explained.

The retort has, approximately midway of its top and bottom, an outlet 22 for vapors of distillation. The outlet is during the distillation of the zinc connected to an appropriate condenser of conventional design, but during the preheating, the outlet is opened to the air for the free escape of vapors.

The retorts of the two units A and B are connected by two or more valve-controlled tuyères 23 through which air, steam or other gases, having been first introduced into the spent-charge-unit B, are with their heat burden transferred to the green charge of the unit A.

In the operation of the retort, the charge is introduced into the upper end thereof by temporarily removing the head 16 and the upper electrode 14. The charge consists of the ore in a comminuted state and an excess of approximately fifty percent of crushed coke of any desired fineness.

There should be sufficient coarse coke to prevent the charge from packing so closely as to interfere with the free and unobstructed passage of vapors at any time in the operation of the retort.

It is also desirable that a screen of coarse coke cover the vapor-outlet 22 so that shrinkage of the charge during the reduction process will not uncover the opening and thereby permit of any part of the charge passing out through the opening.

In order to provide for the above requirements in a simple and satisfactory manner, the retort may be charged by first covering the bottom thereof with a layer 24 of coarse coke to a depth of perhaps three or four inches. Cylindrical forms 25 of different diameters are then set upon this layer concentric to each other and to the wall of the retort, and in the annular zones thus formed are fed the ore and the coke or other porous agent, in alternate relation, it being for reasons stated hereinabove, desirable that the outer zone which directly communicates with the vapor-outlet be filled with coke. After the retort has been loaded, the steel forms are lifted out and the head and upper electrode are replaced.

The ore, if consisting of zinc sulphides, should be calcined before it is placed in the retort to eliminate sulphur and obtain zinc oxide. If the charge consists of carbonate zinc ores, calcining is not essential since all the objectionable gases can be driven off in the preheating step of the process.

Another method of charging the retort is to introduce the mixture of calcined ore and coke without providing for the porous coke screens. In such a case, it is desirable to provide coarser coke than what is used in the first described method.

Both methods aim to provide a protection against solid matter passing out of the vapor-outlet, and the last-described method is advantageous in that the charge may be dumped into the retort without the arrangement of ore and reduction agent, required in the other method.

Preheating the charge of the retort in place prior to the electrical reduction of the zinc, is an essential part of the process, and it is accomplished by the passage of heated gases through the loose and porous granular mass of ore and coke of which the charge is composed.

The air or steam employed for the purpose of preheating are preferably heated to the required temperature by blowing them through the hot residue in the retort from which the zinc has just been distilled (the unit B of the drawings) and they are passed into the fresh charge in the retort in operation (the unit A) through the tuyères 23 whose valves have been previously opened. The residue in the spent retort, mostly made up of hot coke, silica, iron and gangue, generates sufficient heat when the steam or air are driven through it, so that the hot reducing gases will reduce these base metals in the operating retort, (such as iron, manganese, copper, etc.) which are reduced to the metallic form at a temperature less than the reduction temperature of zinc. The by-product gases, especially $CO_2$ are thereby driven off prior to the reduction and distillation of the zinc, thus avoiding the dilution of the zinc-vapors and providing an optimum concentration of zinc-vapor for successful condensation to spelter zinc.

It is evident that in order to obtain this result preheating must take place in the presence of a reducing agent, such as is provided by the coke in the charge. Preheating the charge in the manner hereinabove described, not only eliminates the objectionable gases, which upon their generation escape through the open outlet of the retort, but it has the additional advantages of increasing the temperature of the charge to a point at which it becomes a good conductor of electricity, of eliminating moisture, and of forming a certain amount of sponge iron by reduction of iron in the ore, which takes care of any residue of sulphur combined with the zinc, which had not been eliminated by preliminary calcination.

It is to be understood that while the gases used to preheat the charge may be brought to the required temperature by other means, from an economic point of view the method hereinabove described, is highly desirable, more particularly since it not only takes advantage of the temperature gradient between the hot spent gas and the cold fresh charge, but also involves the generation of more heat by a partial combustion of the gases as they come in contact with the residue.

After the charge in the retort has been preheated to the desired extent, it is heated electrically by the current passing through the resistant mass confined between the electrodes represented by the conductive top- and bottom-slabs of the retort. The heat thus generated, reduces the zinc to zinc-vapors that pass through the loose and porous mass to the egress opening which now is in connection with a suitable condenser in which the vapors are brought to the liquid state.

The method of heating the charge in the zinc-reducing step of the process is another important feature of the invention, since in order to produce the best and most satisfactory results, the reduction temperature must be controlled and properly regulated.

A uniform temperature at all times during the entire zinc-reducing step of the process is desirable because it prevents possible overheating of the mass, resulting in the volatilization of materials that most certainly would interfere with condensation of the zinc-vapors, and means are to be provided in the form of the above mentioned transformer or other controlling device, to regulate the input of electric energy in order to lower the voltage in proportion to the natural decrease of resistance in the charge as the reduction-process progresses.

In this connection it is to be observed that as the charge settles to the bottom of the retort, the upper electrode descends, thus remaining in constant contact with the charge and in this manner maintains the heat in the resistor at an even temperature by the traversing current.

A further necessity for proper heat-control is created by the requirement of a non-slagging or non-fusing charge while the reduction process is carried on. The present process differs in this respect from smelting processes in which the formation of a liquid slag is a desideratum if not an essential.

In the reduction of the zinc by the passage of an electric current through a loose and porous granular mass of ore and coke in the above described manner, the formation of slag would be detrimental for several reasons, notable among which are that if the charge were fused the zinc would be boiled out of the liquid mass, and that excessive fusing and agglomeration of the mass would hinder and obstruct the generation of the zinc vapors and their free passage to the point of egress.

Accurate control of the temperature at which the charge is reduced, will result in avoiding local high temperatures and any slag formed will be left in a more or less granular condition and distributed in small masses throughout the coke-residue.

Although ordinarily the residues resulting from the reduction of zinc-ores are sufficiently infusible without the employment of agents to counteract detrimental fusion, it may be necessary to prepare the charge chemically to prevent excessive slagging. Silica, for example, may be added to counteract liquid-forming basic constituents in the charge.

Upon completion of the process, the residue of the retort in which the gases used for preheating the fresh charge in the other retort, were brought to the required temperature, is discharged by lowering the electrode-bottom on which the residue is supported. A fresh charge is loaded into the empty retort in the manner herein above described, and the retort in which the zinc has just been distilled now takes the place of the other in supplying the heat required for pre-heating the fresh charge prior to the recovery of its zinc-contents.

It will thus be observed that although the process is intermittent in that it provides for the treatment of the material in batches of predetermined quantities, the alternate use of the retorts renders it practically continuous from a point of time. Relatively large quantities may be treated at one time, and within practical limits, a charge of up to four or five tons not being excessive.

The process has every advantage of the old retort in which the charge was subjected to externally applied heat, and it has the added advantages of the direct application of electric current, and its complete control for the proper regulation of temperature, the preheating of the charge in its various aspects, and the economic use of heat which otherwise would have been wasted, to produce the heat required in the preheating step.

Having thus described my invention what I claim and desire to secure by Letters-Patent is:

1. The method of operating a pair of zinc distilling furnaces, consisting in passing gases through a spent charge in place in one furnace and then through a fresh charge in place in the second furnace, then distilling vapors from the latter charge, removing the spent charge from the first furnace and recharging same, and then passing gases through the spent charge in place in the second furnace and through the fresh charge in the first furnace.

2. In a process of distilling zinc from zinc ores, the successive steps of preheating a charge in a reduction chamber by passing a heated gas through the charge, distilling the charge, and, after distillation, passing a gas through the spent charge in said chamber, for use in preheating a fresh charge in another chamber.

3. In a process of distilling zinc from zinc ores, the successive steps of distilling a charge in a reduction-space, and after distillation, passing a gas through the residue in said space, for use in preheating a fresh charge in another space.

4. In a process of distilling zinc from zinc ores, the successive steps of preheating a charge in a reduction space, then heating the charge in said space electrically for the reduction of zinc to zinc vapors, and then passing a gas through the residue in said space, for use in preheating a fresh charge in another space.

5. In a process of distilling zinc from zinc ores, the successive steps of heating a charge in a reduction space, electrically for the reduction of zinc to zinc vapors, and then passing a gas through the residue in said space, for use in preheating a fresh charge in another space.

In testimony whereof I have affixed my signature.

WARREN F. BLEECKER.